(12) United States Patent
Arciuolo et al.

(10) Patent No.: US 8,619,086 B2
(45) Date of Patent: Dec. 31, 2013

(54) MANAGING THREE DIMENSIONAL SCENES USING SHARED AND UNIFIED GRAPHICS PROCESSING UNIT MEMORY

(75) Inventors: Antony Arciuolo, Santa Clara, CA (US); Ian Lewis, Santa Clara, CA (US); Kevin Myers, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 791 days.

(21) Appl. No.: 12/433,032

(22) Filed: Apr. 30, 2009

(65) Prior Publication Data

US 2010/0277484 A1    Nov. 4, 2010

(51) Int. Cl.
*G06T 19/00* (2011.01)

(52) U.S. Cl.
USPC .............................. 345/502; 345/419; 345/541

(58) Field of Classification Search
None
See application file for complete search history.

(56) References Cited

U.S. PATENT DOCUMENTS

| | | | |
|---|---|---|---|
| 5,856,921 A * | 1/1999 | Kim et al. | 700/3 |
| 7,095,416 B1 * | 8/2006 | Johns et al. | 345/522 |
| 7,447,873 B1 * | 11/2008 | Nordquist | 712/22 |
| 2004/0088334 A1 * | 5/2004 | Klein | 707/203 |
| 2005/0148358 A1 * | 7/2005 | Lin et al. | 455/550.1 |
| 2009/0240860 A1 * | 9/2009 | Coon et al. | 710/200 |
| 2010/0118041 A1 * | 5/2010 | Chen et al. | 345/542 |

* cited by examiner

*Primary Examiner* — Kee M Tung
*Assistant Examiner* — Sing-Wai Wu
(74) *Attorney, Agent, or Firm* — Trop, Pruner & Hu, P.C.

(57) ABSTRACT

Three dimensional scenes may be managed between a central processing unit and a graphics processing unit using shared and unified graphics processing unit memory. A shared bus memory may be synchronized between the central processing unit and the graphics processing unit. The shared bus memory may be used for more often updated components and other memory may be used for less often updated components. In some embodiments, if the graphics processor and the central processor use a common processor instruction set architecture, data can be sent from the central processor to the graphics processor without serializing the data.

19 Claims, 2 Drawing Sheets

MANAGING THREE DIMENSIONAL SCENES USING SHARED AND UNIFIED GRAPHICS PROCESSING UNIT MEMORY

BACKGROUND

This relates to graphics processing using a central processing unit in conjunction with a graphics processing unit.

A graphics system synthesizes an image from a description of a scene. Thus, graphics processing may be used in medical imaging, video games, and animations, to mention a few applications. The scene may contain geometric primitives, lights that illuminate the scene, material properties that describe the way an object reflects light, and a viewer's position or orientation. In some cases, graphics processing may be done by a general purpose processor and in other cases it may be done by a combination of a general purpose processor and a graphics processor.

Many issues arise in conjunction with the transfer of data between the central processing unit and the graphics processing unit. Generally, the two systems work in different architectures and, therefore, exchange of complex information between these systems may be slow.

DETAILED DESCRIPTION

Figure 1:
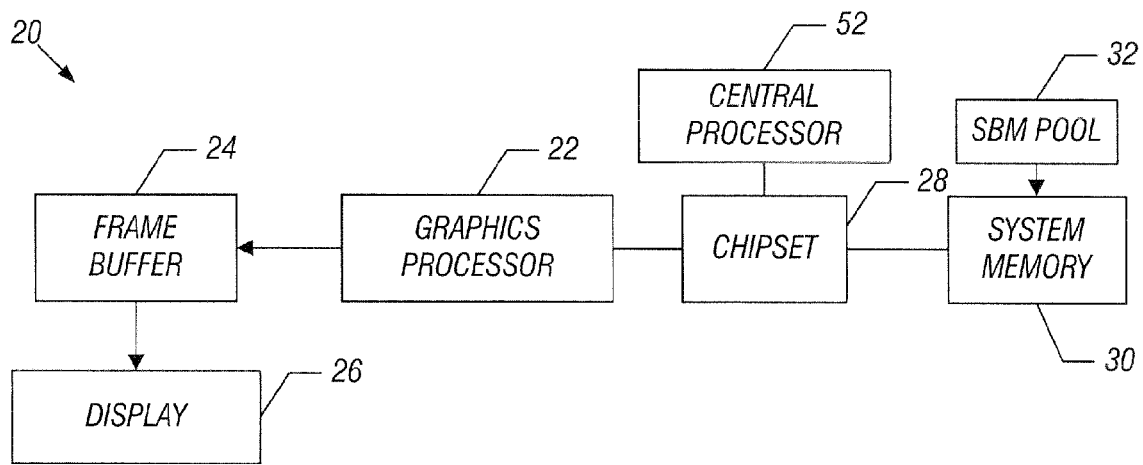
FIG. 1 is a system depiction for one embodiment of the present invention.

A computer system 20 may be any system that processes graphics scenes, including a computer, a cellular telephone, a television system, a media player, and a medical imaging system, to mention a few examples. Scenes are containers for scene objects, which have the potential to be drawn subject to culling and occlusion. A scene object is potentially renderable and contains handles to shared data, such as meshes and textures, and per-instance data, such as position, animated pose, and materials.

In one exemplary architecture, a display 26 is coupled to a frame buffer 24. The frame buffer 24 receives the output of a graphics processor or processing unit 22. The graphics processor 22 may be coupled to a central processor or processing unit 52 through a chip set 28. The chip set 28 also couples a system memory 30.

In accordance with some embodiments of the present invention, a software-based sequence, called a shared bus memory (SBM) pool 32, may be stored in the system memory or in any other storage associated with the system 20. In some embodiments, the shared bus memory pool 32 enables facile data transfers between a central processing unit 52 and a graphics processing unit 22 over a shared bus memory.

As used herein, a shared bus memory is memory that is synchronized between two physically separate heaps, such as those associated with a central processing unit and a graphics processing unit.

In particular, in systems in which the graphics processor 22 and central processor 52 share a common processor instruction set architecture, such as the X86 processor instruction set architecture available from Intel Corporation, information may be more readily communicated between the two processor. Particularly, pointers generated by the central processing unit 52 may be used in the graphics processing unit 22. Thus, in connection with certain data types and, particularly, small, frequently updated data types, information from the central processing unit can be exchanged in a way that it can be readily used, without significant serialization, in the graphics processing unit (and vice versa). Examples of such data include scene objects, materials, animated poses, and particle system objects.

The shared bus memory may be internally hierarchical (in that the structure may contain pointers) and may use versioned data structures. A versioned data structure is like any other container, but it is accessed, not only by a key to the data itself, but also by a key to a specific simulation frame. With versioned data, the post-tessellated vertex buffer of a mesh can be read for frame X, while frame X+1 is being written.

For memory efficiency, in some embodiments, only enough frames are retained to hide latency. A copy-on-write (CoW) optimization may be used for infrequently changing data, such as textures.

Figure 2:
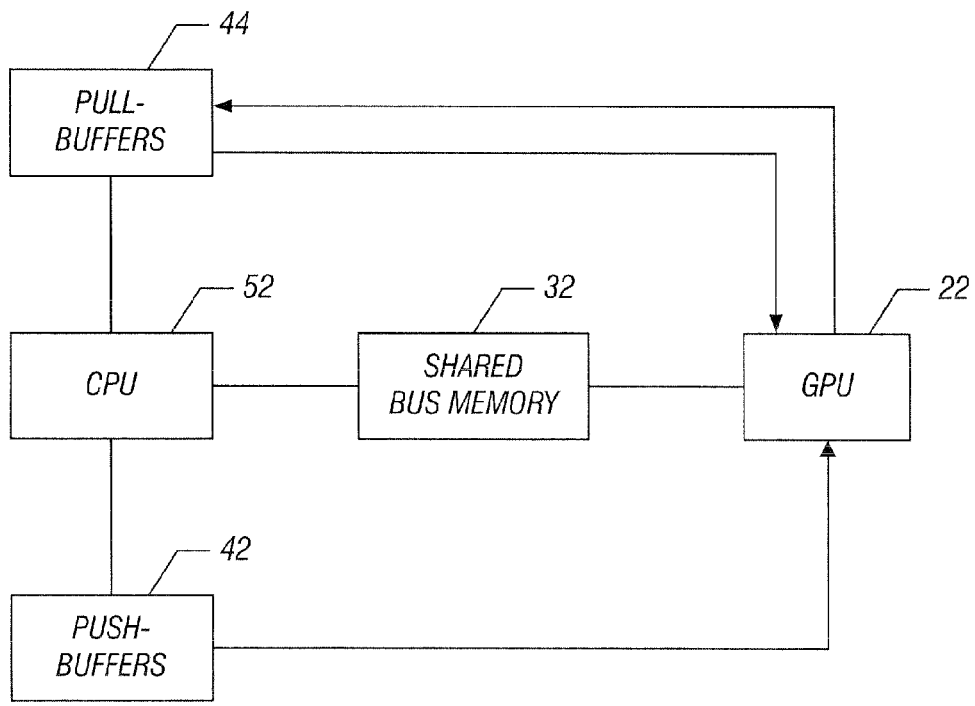
FIG. 2 is a schematic depiction of a shared bus memory according to one embodiment.

Thus, while small, frequently updated data may be handled through the shared bus memory pool, other information may be handled conventionally, for example, using pushbuffers 42, shown in FIG. 2. Using a pushbuffer, the central processing unit 52 acts as the main controller of game logic and rendering, so that, for each frame, the visible state is marshaled and sent to the graphics processor for rendering. A pushbuffer may be used, for example, for large data that is already serialized, infrequently updated data. For example, meshes and skeletons are loaded infrequently using a pushbuffer. These structures are often flat lists of vertices, indices, and matrices.

Similarly, textures may be handled through a pushbuffer as well. Using a pushbuffer allows the central processing unit memory for these large objects to be transient. Moreover, for each frame of the simulation, the visible data is marshaled and sent to the graphics processor for rendering using the pushbuffer.

Pullbuffers 44 may also be used with the graphics processing unit 22. The pullbuffers act as the main controller for rendering and the central processor acts as the main controller of game logic. Both the graphics processing unit and the central processing unit may run in their own loops and if the graphics processing unit accesses data that is either out of date or not present, the graphics processing unit may request the data from the central processing unit, with the graphics processing unit either stalling or using proxy data until the central processing unit can service the request.

The central processing unit simulation may run its own update loop with each frame writing out a virtual state to the shared bus memory pool. Once the central processing unit simulation has prepared a full frame, a flush may be issued to synchronize the shared bus memory with the graphics processing unit memory.

On the graphics processing unit's side, the simulation also runs on its own loop and primarily reads out of the shared bus memory and the pushbuffer data. For per-instance cached data, such as the results of subdivision, surface tessellation or skinning or tessellation of particles, virtual memory mapping may be leveraged to reduce fragmentation. Otherwise, the graphics processing unit may be used to allocate these large buffers. Smaller buffers may be grouped together already in the shared buffer memory pool unless segregated and well contained.

The data structures used to retain the large allocations may use versioned data structures. The shared bus memory operates on a lower level than versioned data structures, but all containers of structures in the shared bus memory may be versioned data structures, in one embodiment, so that retrieving data structures is similar. While the latter part of the graphics processing pipeline reads data from one version of data in a versioned data structure, earlier parts including the pushbuffer landing and shared buffer memory synchronization may occur on another version, in some embodiments. This approach works well with advanced effects based on velocity, such as motion blur, because the last frame's data is already available.

In some embodiments, meshes and skeletons are retained in the graphics processing unit and, thus, they may seldom be sent across the bus. Textures may be pulled into the graphics processor unit on demand. Higher level game objects, such as scene objects, particles, and materials, may be managed through the shared bus memory.

All structures may be written to their container with a handle and a frame handle in the pushbuffer. Reads from the containers may be done with a data handle and a frame handle so that reads and writes of data is N-buffered. Whole scene data may be sent to the graphics processing unit. Scenes may be gross-culled by the central processing unit, such as zones or levels or a streaming system. Reflections, objects that cast shadows, or objects that might be important in a few frames in the future may be stored in the graphics processing unit. Of this set, for each pass, a view may be determined, either from eye, from light, or from a reflection plane, and a frustrum may be culled against the scene. This work may be done in parallel or can be pipelined to fill idle time.

Any rendering pipelines can then be employed on the visible scene objects, but with the power of unified video memory, a single heap memory is wholly available from any stage in the graphics pipeline, including culling, vertex, geometry, pixel, post-processing, etc. and all interpolations in between stages. In addition, versioned data structures may simplify latency protection and contention.

Pipelines, such as deferred rendering, that attempt to cache computation results in screen-sized buffers may no longer be needed with those large buffers, in some embodiments.

With the shared bus memory, a geometry buffer of barycentrics and a real pointer back into a source vertex buffer may be used. Barycentrics are coordinates with respect to a reference triangle or quad. There is no need to cache the interpolated results of the common programmable graphics pipeline because those results can be interpolated later in the pixel shader.

Thus, in some embodiments, the graphics processor and the central processor may both use the same architecture, such as the X86 architecture. In addition, in many embodiments, it is advantageous that the graphics processor 22 be a multicore processor. As a result, it is not necessary to serialize data transfers between the central processing unit and the graphics processing unit. Instead, with shared buffer memories, high level objects may be sent directly by the central processing unit to the graphics processing unit. The same pointers used in the central processing unit may be used in the graphics processing unit, in some embodiments.

As a result, the central processing unit and the graphics processing unit memories may be treated as one shared and unified memory in some embodiments. The use of one shared and unified memory may enable more robust utilization of graphics processor memory by allowing richer data structures and simplified central processor and graphics processor management. Processing may be done in the same heap, in some embodiments, so data can be cached at any stage of a graphics pipeline. Redundant calculations may be reduced as a result, in some embodiments.

Figure 3:
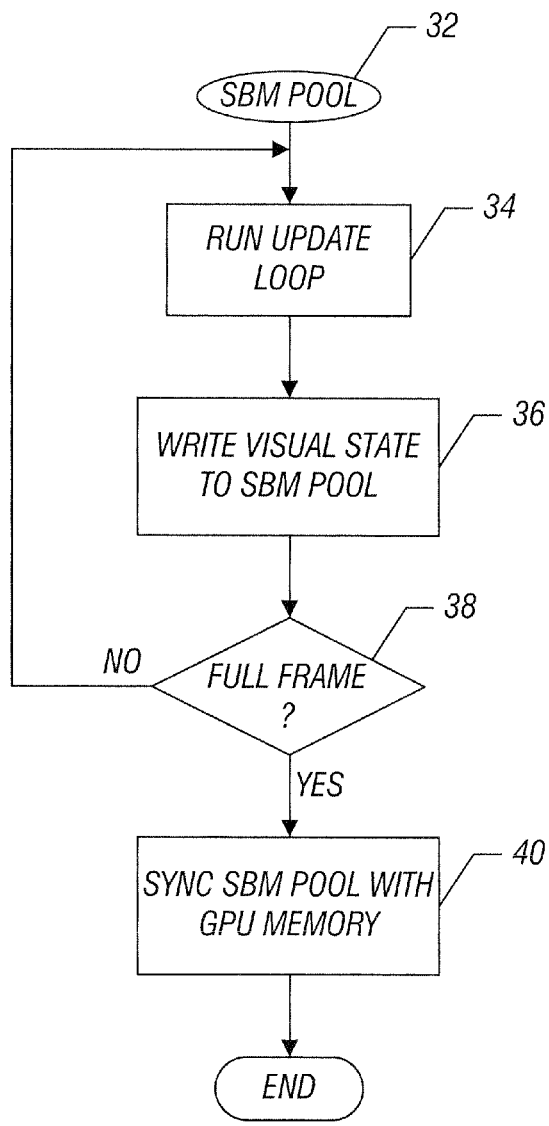
FIG. 3 is a flow chart for one embodiment.

Thus, referring to FIG. 3, the SBM pool software 32 may be implemented by running the update loop, as indicated in block 34, in the central processing unit 52. The update loop is whatever simulation is being run on the processor 52, such as game logic or physics, that affects the rendering. The software 32 may be stored on any conventional computer readable medium including a semiconductor memory, including memory internal to the processing unit 52 and/or external thereto, such as the system memory 30. The software 32 includes instructions executed by the processing unit 52 in one embodiment.

The visual state, including geometries, fixtures, material properties, and positions of lights and cameras, generated during the update loop may be written to the SBM pool, as indicated in block 36. When a full frame has been developed, as determined in diamond 38, the SBM pool may be synchronized with the graphics processing unit memory, as indicated in block 40. Again, this may be done by using a geometry buffer with barycentrics. A geometry buffer forms an enriched image space wherein each pixel of the image space holds arbitrary additional information. The information that may be held may include depth, normal and texture coordinates.

The rendering, using a geometry buffer, may involve two steps. First, the attributes of the buffer are generated in a two-dimensional domain. Examples of such attributes include color, alpha value, depth, texture coordinates, or normal per-fragment. The second step, called buffer operations, receives this information and accesses more than two-dimensional color information. Thus, the geometry buffer holds data that is not restricted to the two-dimensional image plane.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   processing three dimensional scenes between a central processing unit and a graphics processing unit using a shared bus memory;
   storing particular components of the three dimensional scenes in the shared bus memory based on data types of the particular components; and
   using versioned data structures for the containers of structures in the shared bus memory.

2. The method of claim 1 including synchronizing the shared bus memory between the central processing unit and the graphics processing unit.

3. The method of claim 1 including using said shared bus memory for more often updated components and using a buffer for less often updated components.

4. The method of claim 3 including using a pushbuffer for said less frequently updated components and components that are already serial in structure.

5. The method of claim 4 including using said pushbuffer for relatively larger components and using said shared bus memory for relatively smaller components.

6. The method of claim 1 including referencing said shared bus memory by a pointer.

7. The method of claim 1 including transferring data between the central processing unit and the graphics processing unit without serializing the data.

8. The method of claim 1 including using a same processor instruction set architecture for the central processing unit and the graphics processing unit.

9. The method of claim 8 including using a multicore processor.

10. An apparatus comprising:
    a shared bus memory to store particular components of three dimensional scenes based on data types of the particular components including versioned data structures for the containers of structures in the shared bus memory;
    a graphics processing unit; and
    a central processing unit coupled to said graphics processing unit, said central processing unit and said graphics processing unit to manage the three dimensional scenes using the shared bus memory.

11. The apparatus of claim 10 wherein said shared bus memory is synchronized between the central processing unit and the graphics processing unit.

12. The apparatus of claim 10, said shared bus memory for more often updated components and a buffer for less often updated components.

13. The apparatus of claim 12 including a push buffer for said less often updated objects and objects that are already serial in structure.

14. The apparatus of claim 13, said push buffer for relatively larger data and said shared bus memory for relatively smaller data.

15. The apparatus of claim 10, said shared bus memory referenced by a pointer.

16. The apparatus of claim 15 wherein said shared bus memory is internally hierarchical.

17. The apparatus of claim 10 wherein said central processing unit to transfer data to said graphics processing unit without serializing the data.

18. The apparatus of claim 10 wherein said central processing unit and graphics processing unit have the same processor instruction set architecture.

19. The apparatus of claim 18 wherein one of said processors is a multicore processor.

\* \* \* \* \*